Figure 1:
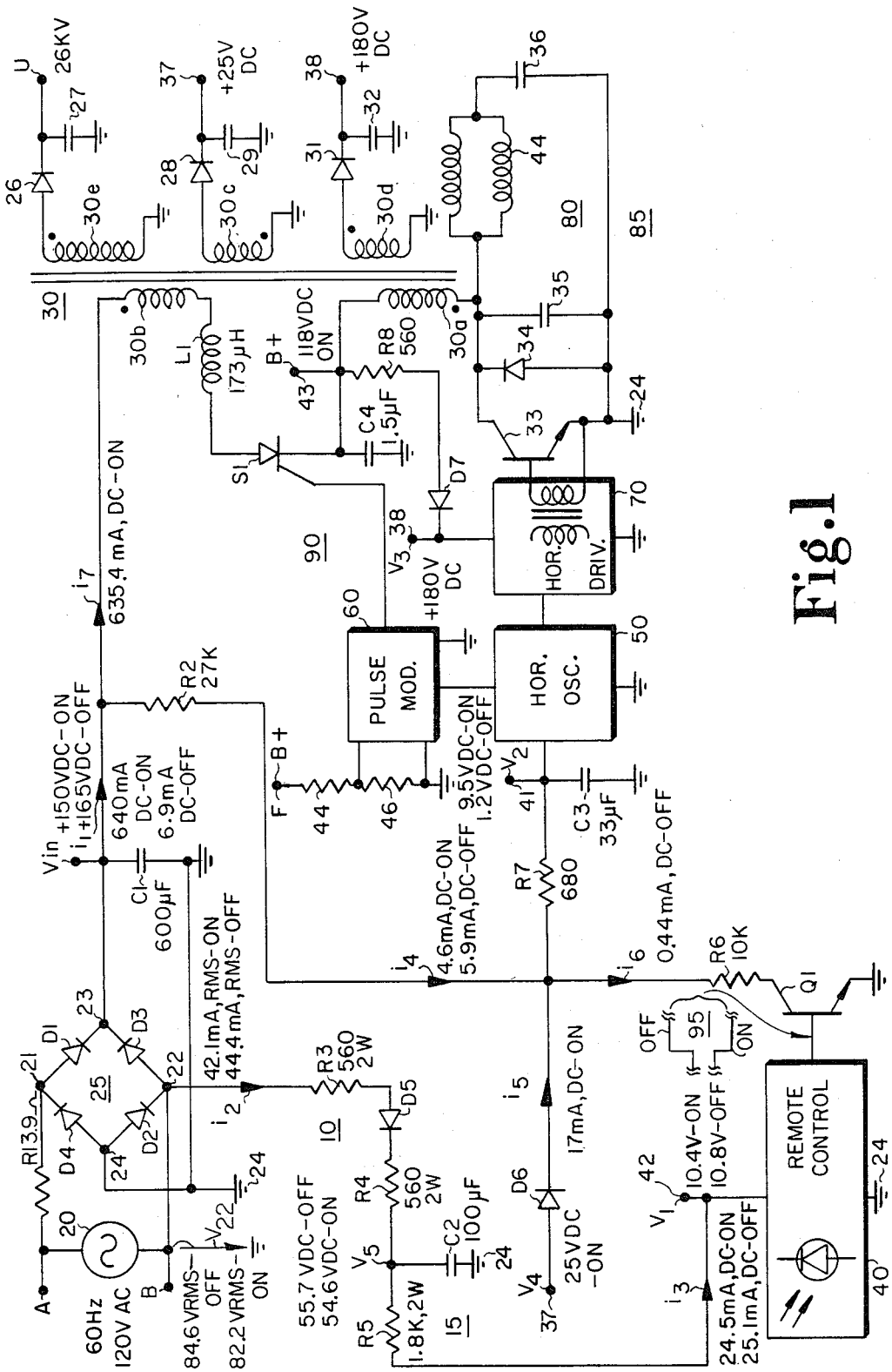

United States Patent [19]

Duvall et al.

[11] Patent Number: 4,500,923
[45] Date of Patent: Feb. 19, 1985

[54] TELEVISION RECEIVER STANDBY POWER SUPPLY

[75] Inventors: William E. Duvall; Mau-Choung P. Hwang, both of Indianapolis, Ind.

[73] Assignee: RCA Corporation, New York, N.Y.

[21] Appl. No.: 437,832

[22] Filed: Oct. 29, 1982

[51] Int. Cl.³ .......................... H04N 5/44; H01J 29/70
[52] U.S. Cl. ...................................... 358/190; 315/411
[58] Field of Search .................. 358/190, 194.1; 315/411, 101, 105, 204; 455/127, 343; 363/17, 34

[56] References Cited

U.S. PATENT DOCUMENTS

| | | | |
|---|---|---|---|
| 3,949,403 | 4/1976 | Yoshida et al. | 343/225 |
| 3,956,669 | 5/1976 | Del Ciello . | |
| 4,024,577 | 5/1977 | Diethelm | 358/190 |
| 4,262,232 | 4/1981 | Willis | 315/8 |
| 4,435,731 | 3/1984 | Kliebphipat | 358/190 |

*Primary Examiner*—Tommy P. Chin
*Attorney, Agent, or Firm*—Eugene M. Whitacre; Paul J. Rasmussen; Joseph J. Laks

[57] ABSTRACT

In a power supply for a remote controlled television receiver, a bridge rectifier includes first and second unidirectional current conducting devices, an output terminal, a current return terminal and two input terminals. A remote control circuit generates an on/off command signal. A source of alternating voltage available during both states of the command signal is coupled between the two input terminals. A first direct voltage is developed between the output and current return terminals during both the on and the off states of the command signal upon alternate conduction of the two unidirectional current conducting devices. A first power supply is coupled between the bridge rectifier output and current return terminals and is responsive to the command signal for developing an operating potential from the first direct voltage only during the on-state of the command signal. A load circuit is energized by the operating potential to draw power from the bridge rectifier output terminal. The remote control circuit is energized by a standby DC power supply that employs one of the bridge rectifier unidirectional current conducting devices to develop a second, lower magnitude direct voltage that energizes the remote control circuit during both the on and off states of the command signal. The standby power supply includes a filter circuit having an input terminal coupled to one of the unidirectional current conducting devices of the bridge rectifier for half-wave rectifying and filtering the alternating voltage. The second direct voltage is developed between the filter output and current return terminals.

8 Claims, 1 Drawing Figure

TELEVISION RECEIVER STANDBY POWER SUPPLY

This invention relates to a power supply for a remote controlled television receiver.

In a remote controlled television receiver, a remote control circuit generates an on/off command signal to switch operation of the television receiver between the run-mode and the standby mode. In the run-mode, operating potentials for various television receiver circuits such as the signal circuits and ultor high voltage circuit are developed, illustratively, from the horizontal output transformer of the horizontal deflection circuit. To place a television receiver in the standby mode by the removal of such operating potentials, a remote control circuit, such as found in the CTC 120 color television receiver manufactured by RCA Corporation, Indianapolis, Ind., develops the off-state of an on/off command signal. A switching transistor responsive to the command signal and coupled to the horizontal oscillator voltage supply terminal, changes states to remove supply voltage from the horizontal oscillator thereby disabling the development of run-mode operating potentials from the horizontal output transformer.

In the aforementioned CTC 120 television receiver, the AC line mains supply voltage is applied across the output terminals of a full-wave bridge rectifier without the interposition of a mechanical switch portion of a remotely controlled on/off relay. Thus an unregulated DC input voltage is developed between the output terminal and the current return terminal of the bridge rectifier both during the run-mode of operation and during the standby mode of operation. The unregulated DC voltage is a relatively large magnitude voltage of, illustratively, +150 volts DC. The remote control circuit itself requires a standby DC power supply to remain energized and operating even during the off-state of the command signal.

Heretofore, to supply a standby DC voltage to the remote control circuit, a relatively large value dropping resistor was located between the +150 V output terminal of the bridge rectifier and the voltage supply input terminal of the remote control circuit. This resistor drops the supply voltage from +150 volts to the required lower magnitude supply voltage of, illustratively, +11 volts that is used by the remote control circuit. The use of such a dropping resistor is relatively wasteful of power. Also, the resistor is a relatively costly one since it must be designed to dissipate a substantial amount of power.

A feature of the invention is a power supply for a remote controlled television receiver that provides a low magnitude standby DC voltage at reduced standby power consumption without the need for large dropping resistors and without the need for electromechanical on/off relays. In accordance with the invention, the standby DC power supply includes a filter circuit that has its input terminal coupled to one of the unidirectional current conducting devices of the mains supply bridge rectifier and a current return terminal coupled to the current return terminal of the bridge rectifier. The remote control circuit is coupled as a load between the output terminal of the filter and the current return terminal of the filter. In this way, the bridge rectifier is employed as a half-wave rectifier to develop a second, lower magnitude direct voltage for use by the standby power supply. By using a half-wave rectified voltage, the average or RMS value of such a voltage is much lower than the average or RMS value of a full-wave rectified mains voltage. The dissipation occurring in the series impedance of the filter needed to obtain the lower magnitude standby supply voltage is much reduced compared to the dissipation occurring when using a full-wave rectified waveform.

The sole Drawing FIGURE illustrates a standby power supply for a remote controlled television receiver embodying the invention.

In the accompanying FIGURE, a source 20 of 60 hertz, 120 volts, AC, mains supply voltate is coupled between terminals A and B. A full-wave bridge rectifier 25 includes unidirectional current conducting devices, diodes D1–D4. The alternating polarity mains voltage is applied between input terminals 21 and 22 of bridge rectifier 25 to develop an unregulated DC input voltage Vin between an output terminal 23 and a current return terminal or ground 24. A current limiting resistors R1 is coupled between terminal A and terminal 21, and a filter capacitor C1 is coupled between terminal 23 and ground.

The unregulated DC voltage Vin is applied to an SCR switching regulator 90 to develop therefrom a regulator B+ operating potential at a terminal 43. Switching regulator 90 comprises a silicon controlled rectifier S1 gated on by pulses obtained from a pulse modulator 60, a current limiting and energy storage inductor L1, and a winding 30b of a horizontal output transformer 30 that serves as a source of negative retrace pulses to reset or commutate off SCR S1 each horizontal deflection cycle. The B+ voltage is fed back to pulse modulator 60 from a terminal F through a resistor 44 of voltage dividing resistors 44 and 46.

The B+ operating potential energizes horizontal output transformer 30 and the horizontal output stage 80 of a horizontal deflection circuit 85. Horizontal deflection circuit 85 includes a horizontal oscillator 50 that develops a horizontal rate switching waveform for a horizontal driver stage 70 that in turn switches horizontal output transistor 33 of horizontal deflection circuit 85. Horizontal output stage 80 includes horizontal output transistor 33, damper diode 34, retrace capacitor 35, S-shaping capacitor 36 and horizontal deflection winding 44.

The switching of horizontal output transistor 33 produces retrace pulse voltages across horizontal deflection winding 44 and horizontal retrace capacitor 35. The retrace pulse voltage at the collector of horizontal output transistor 33 is applied to primary winding 30a of horizontal output transformer 30 to develop retrace pulse voltages across windings 30b–30e. Operating potentials for the various television receivers circuits are developed from the voltages produced across windings 30c–30e. For example, the voltage across winding 30c is trace rectified by diode 28 and filtered by capacitor 29 to produce a +25 volt DC operating potential at a terminal 37 for such television receiver circuits as the horizontal oscillator 50, vertical deflection circuit and the signal processing circuits. The voltage developed across winding 30d is retrace rectified by diode 31 and filtered by capacitor 32 to develop a +180 volt DC operating potential at a terminal 38 for such television receiver circuits as the picture tube drivers. The high voltage developed across high voltage winding 30e is rectified by diode 26 and filtered by capacitor 27 to develop an ultor accelerating potential at a terminal U.

During the run-mode of television receiver operation, horizontal deflection circuit 85, including horizontal output transformer 30, functions as a switching power supply to develop DC operating potentials for the various television receiver circuits at supply terminals 37, 38 and ultor terminal U. To place the television receiver in the standby mode of operation the various loads coupled to these supply terminals must be deenergized. This deenergization is accomplished by disabling operation of horizontal deflection circuit 85.

To place the television receiver in standby, a conventional remote control circuit 40 generates the off-state of an on/off command signal 95 to thereby turn on a remote control switching transistor Q1. With transistor Q1 conducting upon initiation of standby operation, current from the +25 volt supply terminal 37 is bypassed from the horizontal oscillator supply terminal 41. Similarly bypassed from terminal 41 is current from the output terminal 23 of bridge rectifier 25. Operating potential for horizontal oscillator 50 is therefore removed, disabling pulse modulator 60 and horizontal driver 70. In turn, SCR switching regulator 90 and horizontal deflection circuit 85 are also disable. In turn, removed are the regulated B+ voltage at terminal 43 generated by switching regulator circuit 90 and the operating potentials developed from the voltages generated across windings 30c–30e of horizontal output transformer 30. By disabling either switching regulator circuit 90 or horizontal deflection circuit 85 or both, standby operation is initiated.

Such a remote control arrangement as just described avoids the use of a relatively costly and potentially failure prone electromechanical relay for on/off switching of the television receiver. Because a relay is not interposed between mains voltage supply source 20 and bridge rectifier 25, the mains supply voltage is available during both the on and off states of command signal 95. Bridge rectifier 25 generates the DC input voltage Vin at output terminal 23 during both standby and run modes of operation by means of the alternate conduction of first, for example, diodes D1 and D2 and then diodes D3 and D4. The DC input voltage Vin may, therefore, be used as a start-up supply for horizontal oscillator 50 upon initiation of the run-mode of television receiver operation.

To turn the television receiver on, remote control circuit 40 generates the on-state of command signal 95 to turn remote control switching transistor Q1 off. Start-up supply current from bridge rectifier output terminal 23 flows through resistors R2 and R7 to the horizontal oscillator supply terminal 41. The start-up current is sufficient to energize horizontal oscillator 50 to provide switching signals to horizontal driver stage 70 and switching signals to pulse modulator 60. Pulse modulator 60 begins to generate gating pulses for SCR S1, to develop the B+ supply voltage at terminal 43. Once sufficient B+ supply voltage has been generated, start-up supply current for the horizontal driver stage 70 is obtained from the B+ terminal 43 through a resistor R8 and a diode D7.

The development of supply voltage at terminal 38 and the development of switching signals by horizontal oscillator 50 enables adequate switching signals to be generated by horizontal driver stage 70. Horizontal output transistor 33 begins switching to generate retrace pulse voltages across the windings of horizontal output transformer 30. The steady-state supply voltages developed at terminals 37 and 38 enable the supply voltages V2 and V3 for horizontal oscillator 50 and horizontal driver stage 70 to be brought up to their steady-stage values.

The power supply arrangement thus far described provides start-up and steady-state operating potentials for switching regulator 90, horizontal deflection circuit 85 and the various television receiver load circuits coupled to horizontal output transformer 30. One additional power supply is required, that is, a standby power supply to provide operating potential for remote control circuit 40 during the standby mode of operation when the off-state of command signal 95 is being generated. Heretofore in the prior art, standby power for remote control circuit 40 was obtained by directly connecting a voltage dropping resistor between bridge rectifier output terminal 23 and the input voltage supply terminal 42 of remote control circuit 40 to develop the lower magnitude DC voltage V1 from the relatively high magnitude input voltage Vin. Illustratively, if the voltage Vin is approximately +150 volts DC and the average current i3 drawn by remote control circuit 40 from terminal 42 during standby is around 25 milliamperes DC, then a relatively costly dropping resistor of approximately 3 kilohms, capable of dissipating 15 watts of powers, may need to be used. The dissipation of such a standby power supply arrangement may be 7 or 8 watts in the standby mode. To dissipate the relatively large amounts of power, the dropping resistor may be required to be located on the metal chassis portion of the television receiver rather than more advantageously on the printed circuit board carrying the remaining remote control circuit elements.

A feature of the invention is a standby power supply for a remote controlled television receiver that has a relatively low standby run-mode power consumption and that produces less heat dissipation in the standby power supply dropping resistors to enable them to be placed on the same printed circuit board as the remaining elements of the remote control circuit. In accordance with the invention, the standby power supply 10, illustrated in the FIGURE, is interposed between bridge rectifier 25 and remote control voltage supply terminal 42. In this manner, one of the bridge rectifier unidirectional current conducting devices, diode D4, serves the additional function of a half-wave rectifier of the alternating mains voltage for use by the DC standby power supply 10.

Standby power supply 10 includes AC mains supply source 20, diode D4 of bridge rectifier 25, a T-section filter 15 comprising resistors R3–R5 and capacitor C2, and a diode D5. The input terminal of T-section filter 15 at the top terminal of resistor R3 is coupled to the input terminal 22 of bridge rectifier 25. A current return terminal of the filter at the bottom plate of capacitor C2 is in common with current return terminal 24 of bridge rectifier 25. The standby supply voltage V1 is developed between the output terminal of filter 15 at terminal 42 and ground 24.

In operation during standby, diode D4 becomes conductive within the polarity interval of the alternating mains voltage when terminal B is positive relative to terminal A. Diode D2 is blocked, and a current i2 flows from terminal B through resistors R3 and R4 to charge filter capacitor C2 to an intermediate DC voltage V5 of magnitude lower than the input voltage Vin. The average value of the current i2 is substantially that of the DC current i3 drawn by remote control load circuit 40. Some of the DC voltage V5 is then dropped across resistor R5 before the final DC supply voltage V1 for remote control circuit 40 is obtained. Using a T-section filter advantageously permits one to reduce the size of the filter capacitor and to use lower power rated resistors. Diode D5 prevents the discharge of capacitor C2 through terminal 22 from occurring during the polarity interval of the mains voltage when diode D2 conducts and D4 is nonconductive.

Because standby power supply 10 uses half-wave rectification of the mains supply voltage, both the average value and the RMS value of the voltage $V_{22}$ at input terminal 22 of bridge rectifier 25 relative to current return terminal 24 is substantially lower than the average value of the input voltage Vin and the RMS value of the mains supply voltage, respectively. Thus, the power dissipated in the resistive elements of power supply 10 when load current flows from input terminal 22 of bridge rectifier 25 to supply terminal 42 of remote control load circuit 40 is substantially reduced compared to the situation where a single dropping resistor is provided between terminal 23 and terminal 42. Similarly, the power dissipated in each of the individual resistors is reduced due to the reduced RMS value of the voltage at terminal 22.

Because of the lower RMS value of the voltage at terminal 22, the power drawn from the mains supply 20 by standby power supply 10 and remote control load circuit 40 is substantially reduced to the order of 4 to 5 watts. Furthermore, the dissipation in individual resistors R3, R4 and R5 is also substantially reduced enabling these dissipative components to be located on the same printed circuit board that the other remote control circuit elements are located instead of requiring them to be located on a heat sink portion of the television receiver metal chassis. Furthermore, because the power rating of resistors R3–R5 are reduced, their components costs are reduced and their reliability is increased. Still further, the inventive arrangement of standby power supply 10 as illustrated in the FIGURE results in less power stress of the bridge rectifier diodes D1–D4 during standby.

What is claimed is:

1. A power supply for a television receiver responsive to a command signal having an on and off state, comprising:

a source of alternating voltage available during both states of said command signal;

a bridge rectifier including first and second unidirectional current conducting devices, an output terminal, a current return terminal and first and second input terminals, said source of alternating voltage coupled between said first and second input terminals so as to develop a first direct voltage between said output and current return terminals during both the on and the off states of said command signal upon the alternate conduction of said first and second unidirectional current conducting devices;

a first power supply coupled between said bridge rectifier output and current return terminals and responsive to said command signal for developing an operating potential from said first direct voltage only during the on-state of said command signal;

a load circuit energized by said operating potential only during the on-state of said command signal to draw power from said bridge rectifier output terminal;

a control circuit for developing said command signal; and a standby DC power supply employing one of the bridge rectifier unidirectional current conducting devices to develop a second, lower magnitude, direct voltage that energizes said control circuit during both the on and the off states of said command signal, including a filter circuit having an input terminal and an output terminal, and having a return terminal coupled to the current return terminal of said bridge rectifier, the input terminal of said filter being coupled to said one unidirectional current conducting device for half-wave rectifying said alternating voltage to develop between said filter output and return terminals said second direct voltage of magnitude lower than that of said first direct voltage, said control circuit being coupled between said filter output and return terminals.

2. A power supply according to claim 1 wherein said filter includes a capacitor for smoothing the voltage that is half-wave rectified by said one unidirectional current conducting device and another unidirectional current conducting device interposed in the current path between said capacitor and said one unidirectional current conducting device for blocking said capacitor from discharging through said path during nonconduction of said one unidirectional current conducting device.

3. A power supply according to claim 2 wherein said filter includes first and second resistors coupled to said capacitor so as to form a T-section filter.

4. A power supply according to claim 2 wherein said one unidirectional current conducting device is coupled between said bridge rectifier current return terminal and one of said bridge rectifier input terminals.

5. A power supply according to claim 4 including a second capacitor coupled between said bridge rectifier output and current return terminals.

6. A power supply according to claim 1 wherein said first power supply comprises an oscillator, switching means responsive to the output of said oscillator, and a switching power supply transformer coupled to said switching means and energized by said first direct voltage during the switching of said switching means to develop said operating potential, said control circuit including means coupled to said oscillator and responsive to said command signal for disabling said oscillator during the off-state of said command signal.

7. A power supply according to claim 6 wherein said oscillator comprises a horizontal oscillator and said transformer comprises a horizontal output transformer having a first winding energized by first direct voltage and a second winding coupled to said load circuit.

8. A power supply according to claim 1 wherein said first power supply comprises a regulator switch for developing said operating potential and a pulse modulator coupled to said regulator switch and responsive to variations in said operating potential for pulse modulating the switching of said regulator switch, said pulse modulator being responsive to said command signal to disable said regulator switch during the off-state of said command signal.

* * * * *